(12) United States Patent
Prost et al.

(10) Patent No.: US 12,736,153 B2
(45) Date of Patent: Sep. 15, 2026

(54) METHODS AND SYSTEMS PROVIDING OPERATIONAL SURVEILLANCE OF VALVES USED IN INDUSTRIAL APPLICATIONS

(71) Applicant: Schlumberger Technology Corporation, Sugar Land, TX (US)

(72) Inventors: Jerome Prost, Clamart (FR); Raphael Gadot, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 428 days.

(21) Appl. No.: 18/549,964

(22) PCT Filed: Mar. 4, 2022

(86) PCT No.: PCT/US2022/018950
§ 371 (c)(1),
(2) Date: Sep. 11, 2023

(87) PCT Pub. No.: WO2022/192085
PCT Pub. Date: Sep. 15, 2022

(65) Prior Publication Data

US 2024/0159327 A1 May 16, 2024

Related U.S. Application Data

(60) Provisional application No. 63/158,960, filed on Mar. 10, 2021.

(51) Int. Cl.
*F16K 37/00* (2006.01)
*H04L 12/66* (2006.01)

(52) U.S. Cl.
CPC .......... *F16K 37/0083* (2013.01); *H04L 12/66* (2013.01)

(58) Field of Classification Search
CPC ..... F16K 37/0083; F16K 17/02; H04L 12/66; G05B 2219/31457
See application file for complete search history.

(56) References Cited

U.S. PATENT DOCUMENTS 10,851,912 B2 12/2020 Wagner-Stuerz
2012/0290261 A1 11/2012 Genta
(Continued)

FOREIGN PATENT DOCUMENTS

JP 6715290 B2 * 7/2020
WO WO-2017137827 A1 * 8/2017 ............ F16K 31/06

*Primary Examiner* — Jennifer Bahls
(74) *Attorney, Agent, or Firm* — Kyle R. Miiller

(57) ABSTRACT

Methods and systems are provided for monitoring the operation of a valve, which employ a data acquisition unit and a gateway device located at an industrial site where the valve is being used, and at least one cloud-computing system located remotely from the industrial site. At least one sensor is mounted on the valve at the industrial site. The data acquisition unit includes an interface to the at least one sensor. The gateway device includes a first interface to the data acquisition unit and a second interface to the cloud computing system. The data acquisition unit is configured to receive at least one sensor signal supplied by the at least one sensor and processes the at least one sensor signal to extract time-series sensor data for supply to a gateway device. The gateway device is configured to forward the time-series sensor data supplied by the data acquisition unit to the cloud computing system. The cloud computing system is configured to receive, store, and process the time-series sensor data communicated from the gateway device for remote monitoring of operation of the valve at the industrial site.

20 Claims, 12 Drawing Sheets

(56) References Cited

U.S. PATENT DOCUMENTS

| | | | |
|---|---|---|---|
| 2016/0217379 | A1 | 7/2016 | Patri et al. |
| 2018/0112795 | A1 | 4/2018 | Anderson |
| 2018/0113442 | A1* | 4/2018 | Nixon ................ G05B 19/4184 |
| 2019/0323919 | A1 | 10/2019 | Fung-A Wing et al. |
| 2019/0353277 | A1 | 11/2019 | Sundareswara et al. |
| 2019/0369984 | A1 | 12/2019 | Malladi et al. |

* cited by examiner

| | | |
|---|---|---|
| Acquisition System | Information Acquisition System and Data Quality | • System Availability (Online / Offline)<br>• Data Quality (Error Rates...)<br>• Hardware Performance Indicator (CPU% RAM%, Hard Drive Space%) |
| Control System | Information on Valve Control | • Applied Static Close Pressure<br>• Valve Actuation Speed<br>• Air Supply Circuit Leak Detection |
| Valve Health | Information of Valve Health and Remaining Useful Life | • Actuation Counter<br>• Status (Open / Close / Opening ...)<br>• Health Indicator for Various Failure Types |

FIG. 4

METHODS AND SYSTEMS PROVIDING OPERATIONAL SURVEILLANCE OF VALVES USED IN INDUSTRIAL APPLICATIONS

CROSS-REFERENCE TO RELATED APPLICATION(S)

This application is a National Stage Entry of International Patent Application No. PCT/US2022/018950, filed on Mar. 4, 2022, which claims priority to U.S. Provisional Patent Application No. 63/158,960, filed on Mar. 10, 2021, which is herein incorporated by reference in its entirety.

FIELD

The present disclosure relates to operational surveillance of one or more valves used in industrial applications.

BACKGROUND

Valves are used in many industrial applications, such as at gas processing plants, that filter natural gas by isolating impurities and non-methane hydrocarbons, or at other facilities that transport or process petroleum fluids or other oilfield fluids. It is common for such valves to fail over time and require maintenance or replacement. Valve failure can cause unwanted interruption and monetary losses that result from the downtime of the valve.

SUMMARY

Methods and systems are provided for monitoring the operation of a valve, which employ a data acquisition unit and a gateway device located at an industrial site where the valve is being used, and at least one cloud-computing system located remotely from the industrial site. At least one sensor is mounted on the valve at the industrial site. The data acquisition unit includes an interface to the at least one sensor. The gateway device includes a first interface to the data acquisition unit and a second interface to the cloud computing system. The data acquisition unit is configured to receive at least one sensor signal supplied by the at least one sensor and processes the at least one sensor signal to extract time-series sensor data for supply to a gateway device. The gateway device is configured to forward the time-series sensor data supplied by the data acquisition unit to the cloud computing system. The cloud computing system is configured to receive, store, and process the time-series sensor data communicated from the gateway device for remote monitoring of operation of the valve at the industrial site.

In embodiments, the data acquisition unit can be supported on the valve.

In embodiments, the data acquisition unit can be configured to receive and process at least one sensor signal supplied by the at least one sensor to detect a valve actuation event and selectively extract certain sensor data corresponding in time to the valve actuation event for supply as part of the time-series data forwarded to the gateway device. Other sensor data not corresponding in time to the valve actuation event can be discarded so that is not supplied as part of the time-series data forwarded to the gateway device.

In embodiments, the data acquisition unit can be configured to receive and process sensor signals that characterize valve actuation pressure and valve position to detect a valve actuation event.

In embodiments, the data acquisition unit can be configured to selectively extract valve acceleration sensor data corresponding in time to the valve actuation event for supply as part of the time-series data forwarded to the gateway device. For example, the valve acceleration sensor data can represent valve acceleration in three orthogonal axes.

In embodiments, the data acquisition unit can be configured to receive and process certain sensor signals supplied by the at least one sensor for supply as part of low frequency time-series data forwarded to the gateway device. For example, the low frequency time-series data can represent at least one of: temperature of the valve, decimated data characterizing at least one operating condition of the valve, and statistical data characterizing at least one operating condition of the valve.

In embodiments, the cloud computing system can be configured to process the time-series sensor data to generate at least one indicator related to operation of the valve or operation of the system. For example, the at least one indicator can relate to at least one of: i) availability or quality of the operation of the system, ii) information on control of the valve, and iii) information on health of the valve or remaining useful like of the valve.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 4 is a chart illustrating three types of indicators that characterize operational modes or status of different parts of the distributed computing platforms of FIGS. 1 to 3;

DETAILED DESCRIPTION

Figure 1:
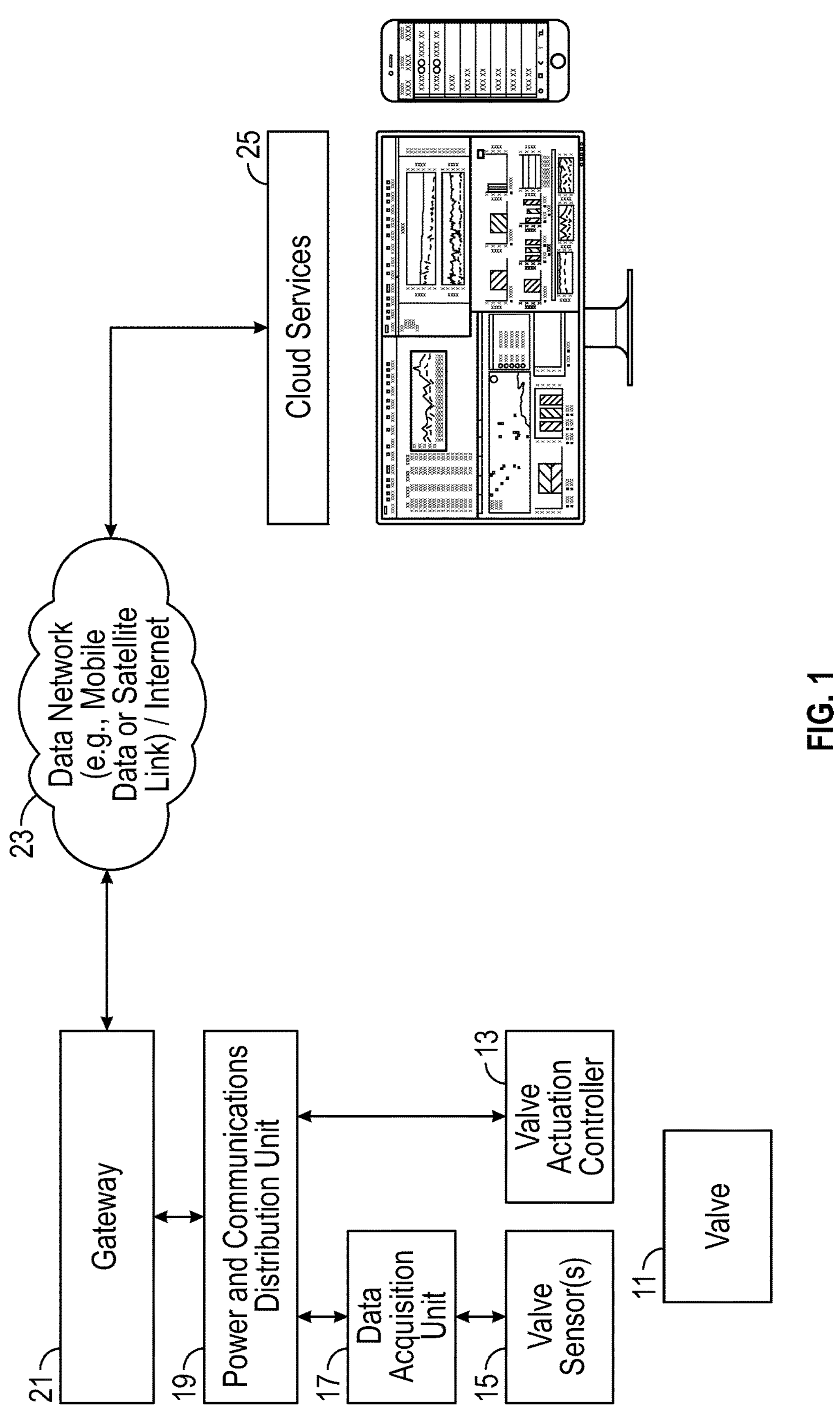
FIG. 1 is a schematic diagram of a distributed computing platform for operational surveillance of at least one valve used in an industrial application.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

The present disclosure provides methods and systems that employ a distributed computing platform for operational surveillance of one or more valves used in an industrial application. The distributed computing platform can be configured to perform such operational surveillance to allow operator users to predict possible failure of a valve in the future and/or predict the need for unplanned maintenance of a valve.

The distributed computing platform can be configured to interface to a variety of sensors and implement various communication protocols to connect to such sensors, which allows for monitoring the operation of a particular valve (such as actuator pressure, valve actuator position and temperature) over time. The signals output by such sensors (referred to as sensor signals) can be collected and processed in real-time by a data acquisition unit located at the facility where the particular valve is being used. The data acquisition unit can process and format the sensor signals (for example, employing analog-to-digital conversion, data conditioning or quality control, data decimation, data aggregation, data buffering, event detection, data timestamping, and data formatting) into time-series sensor data for supply to the gateway device located at the same facility. The gateway device can forward the time-series sensor data supplied by the data acquisition unit to the cloud computing system, which can be configured to receive the time-series sensor data derived from the operation of the particular valve, store such time-series sensor data (for example, in a database), analyze such time-series sensor data to predict possible failure of the particular valve in the future and/or predict the need for unplanned maintenance of the particular valve, and provide notifications or other output related to these predictions to an operator user such that the appropriate remedial measures can be taken to avoid failure or unplanned maintenance of the particular valve.

In embodiments where a facility employs a plurality of valves, a plurality of data acquisition units can be provided that interface to sensor instrumentation of the respective valves of the plurality of valves, and each data acquisition unit of the plurality of data acquisition units can interface to the gateway co-located at the facility. In this configuration, the data acquisition unit that interfaces to the sensors of a respective valve can process and format the sensor signals supplied by the sensors of the respective valve into time-series sensor data for supply to the gateway device located at the same facility. The gateway device can forward the time-series sensor data derived from the operation of the plurality of valves as supplied by the plurality of data acquisition units to the cloud computing system, which can be configured to receive such time-series sensor data, store such time-series sensor data (for example, in a database), analyze such time-series sensor data to predict possible failure of one or more of the respective valves in the future and/or predict the need for unplanned maintenance of one or more of the respective valves, and provide notifications or other output related to these predictions to one or more operator users such that the appropriate remedial measures can be taken to avoid failure or unplanned maintenance of one or more of the respective valves.

In embodiments, the architecture of the distributed computing platform can include the parts shown in FIG. 1, which include at least one data acquisition unit (one shown as 17), power and communications distributions unit 19, and a gateway 21, all residing at an industrial facility (e.g., gas processing plant) that uses one or more valves 11. The platform can further include a cloud computing environment 25 that is located remotely from the facility and configured to provide services that receive the time-series sensor data derived from the operation of the one or more valves 11, store such time-series sensor data (for example, in a database), analyze such time-series sensor data, and provide notifications or other output related to operational surveillance of the one or more valves 11 as described herein.

In embodiments, the data acquisition unit 17 can be a ruggedized computing device that is configured to perform processing of sensor signals supplied by the sensors 15 of the corresponding valve 11. For example, the sensors 15 can output electrical sensor signals that characterize actuator pressure, valve actuator position, temperature, acceleration in one or more axes, and an acoustic measurement of a corresponding valve 11 over time. The data acquisition unit 17 can be configured with a number of data communication interfaces that receive sensor signals supplied by the sensors 15 of the corresponding valve 11. The data acquisition unit 17 can be further configured to process and format the received sensor signals into time-series sensor data for supply to the gateway device 21. The power and communications distribution unit 19 can act as a relay to communicate such times-series sensor data from the data acquisition unit 17 to the gateway 21. Alternatively, the data acquisition unit 17 can communicate the time-series data directly to the gateway 21. The power and communications distribution unit 19 can also act to supply necessary electrical power (e.g., 24V DC power) to the data acquisition unit 17 and to the gateway 21.

In embodiments, the gateway 21 can be a ruggedized computing device that is configured to perform data ingestion of the time-series sensor data supplied by the data acquisition unit(s) 17 at the facility. The gateway 21 can also possibly be configured to enable control of the actuation of the valve(s) 11 at the facility via data communication corresponding to valve actuation controller(s) 13.

In embodiments, the gateway 21 can be configured with a bi-directional communication interface to the physical assets (including the power and communications distribution unit 19, the data acquisition unit(s) 17, and the valve actuation controller(s) 13) at the facility using either a wired communication protocol (such as a serial, Ethernet, Modbus or Open Platform Communication (OPC) protocol) or a wireless communication protocol (such as IEEE 802.11 Wi-Fi protocol, Highway Addressable Remote Transducer Protocol (HART), LoraWAN, Wi-Fi or Message Queuing Telemetry Transport (MATT)). For example, one or more bi-directional communication interfaces between the gateway 21 and the data acquisition unit(s) 17 (for example, with the power and communications distribution unit 19 as an intermediate communication node) can be used to update the operations (e.g., algorithms or software) performed by the data acquisition unit(s) 17 over time, such as actuation detection, data quality checks, and decimation as described herein. Such bi-directional communication interface(s) can also be used to update parameters stored by the data acquisition unit(s) 17 and used by the operations (e.g., algorithms or software) performed by the data acquisition unit(s) 17. Such updates can be communicated from a local device at the facility, such as smartphone or mobile computing device located at the facility. Additionally, or alternatively, such updates can be communicated from a remote device, such as the cloud-computing platform 25 or other computing device or platform located remotely from the facility.

In embodiments, the gateway 21 can be configured with a bi-directional wireless communication interface to the cloud-computing platform 25 using a cellular modem, which enables long-range data transmission. In embodiments, the cellular modem can provide for 4G LTE data transmission capability (with 3G fallback capability) using suitable communication bands in different regions of the world. For facilities without a cellular signal, the bi-directional wireless communication interface to the cloud-computing platform 25 can be provided by a bidirectional satellite link supplied by an optional external satellite communication modem (such as a BGAN modem).

In embodiments, the gateway 21 can employ an embedded processing environment (e.g., data processor and memory system).

In embodiments, the cloud-computing platform 25 can embody one or more cloud services or applications that receive the time-series sensor data derived from the operation of the valve(s) 11 at the remote facility, store such time-series sensor data (for example, in a database), analyze such time-series sensor data, and provide operator users with real-time visualization of the time-series sensor data (such as events or alarms or sensor data pertaining to one or more valves) as well as interpretation and analysis of such time-series sensor data in order to determine a strategy for corrective action for the one or more valves, if need be. For example, the corrective action can possibly avoid an unplanned plant shutdown, optimize a maintenance operation, or optimize valve operating conditions to reduce wear and improve lifetime of a valve.

Figure 2:
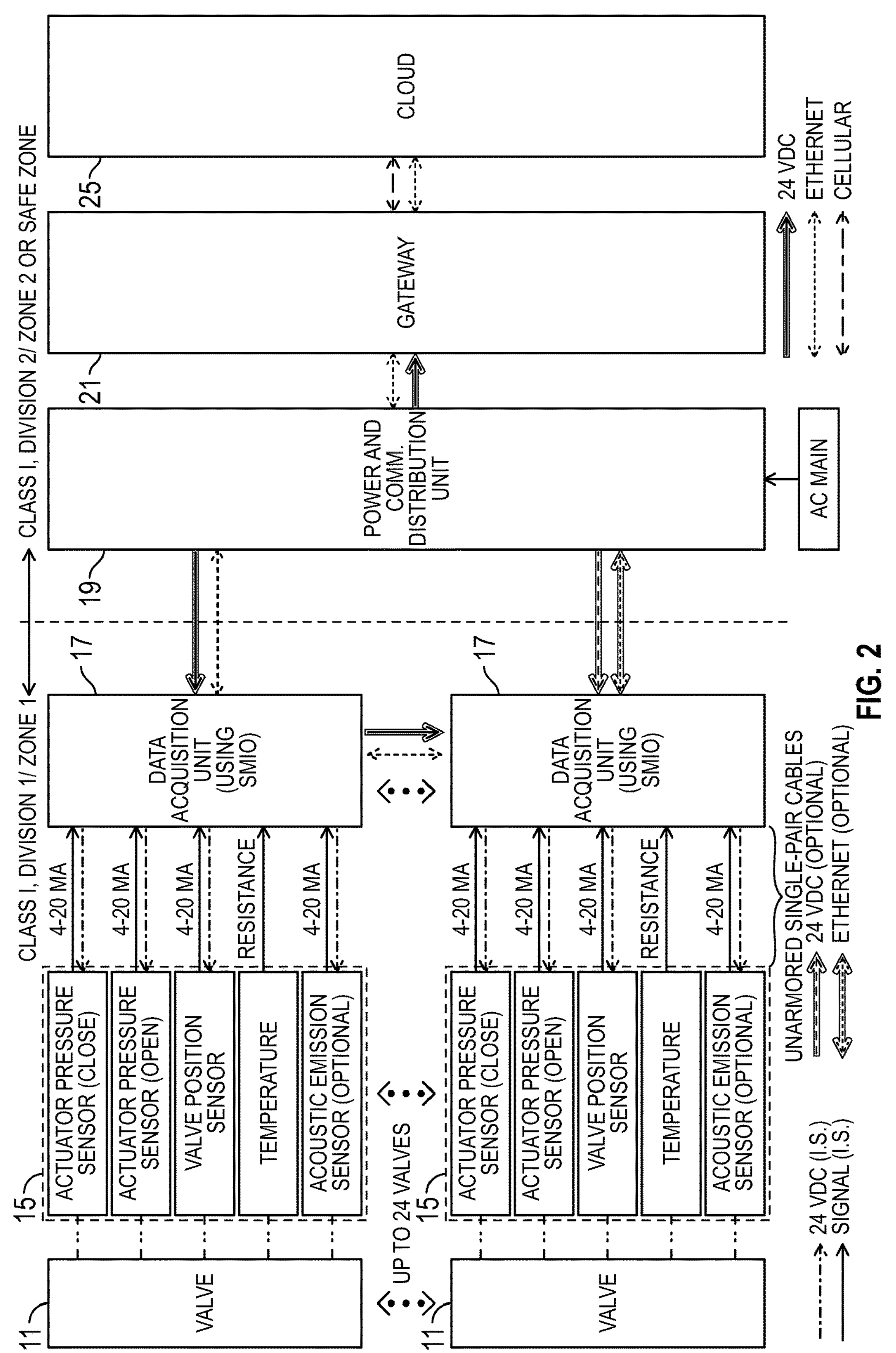
FIG. 2 is a block diagram of a distributed computing platform for operational surveillance of a number of valves used in an industrial application.
Figure 3:
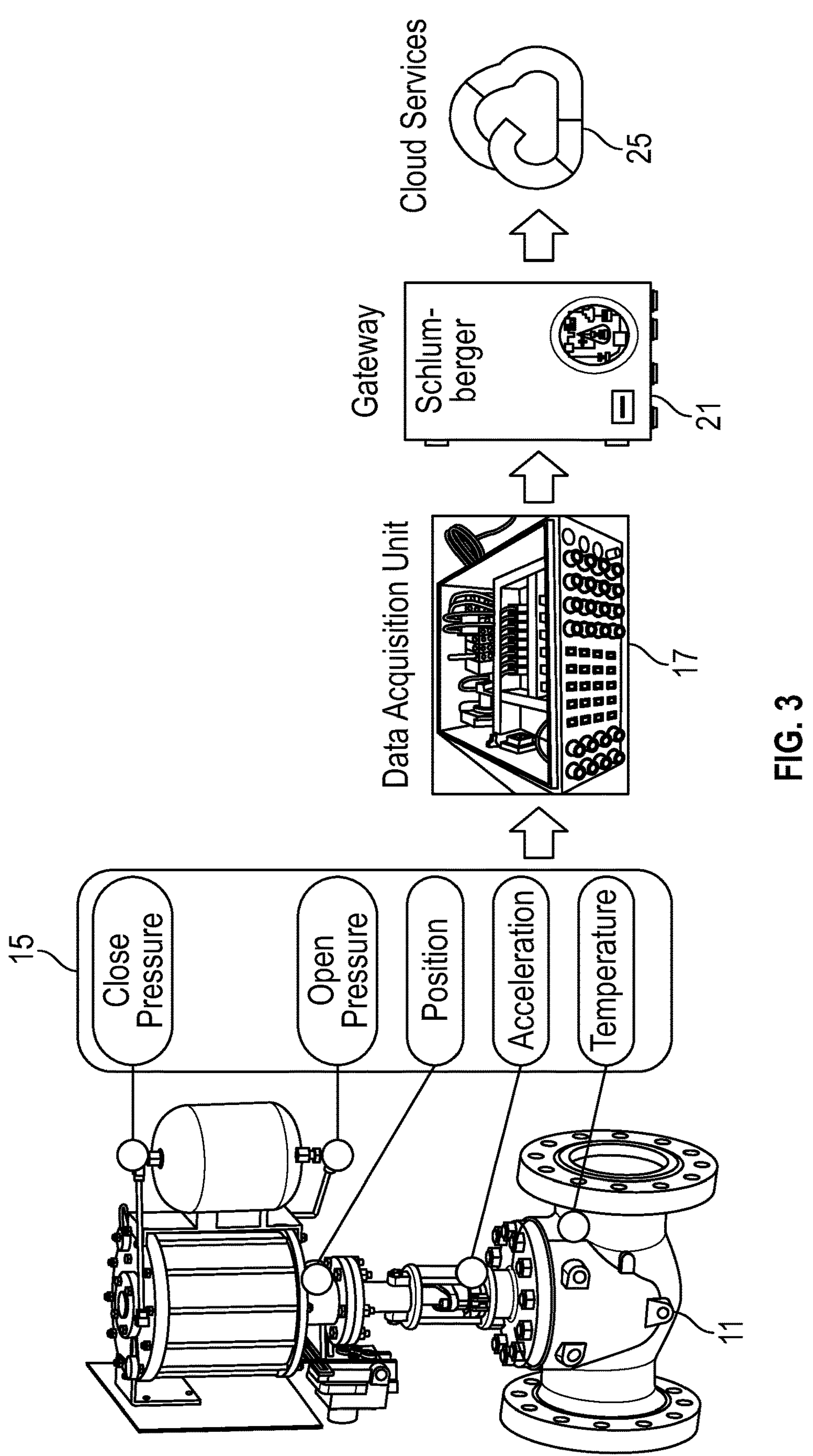
FIG. 3 is a block diagram of a distributed computing platform for operational surveillance of a valve used in an industrial application.

In embodiments, the physical assets of the facility, including the valve sensors 15, the data acquisition unit(s) 17, the power and communications distribution unit 19, and the gateway 21 can interface to one another as illustrated in FIGS. 2 and 3. In this embodiment, the valve(s) 11 can be a ball valve, rising stem ball valves, or other valve type. The sensors 15 generate electrical sensor signals that are indicative of certain operational states or modes or characteristics of a corresponding valve 11, such as actuator pressure when the valve is closed (or closing) represented by a variable current signal in the range of 4-20 mA, actuator pressure when the valve is open (or opening) represented by a variable current signal in the range of 4-20 mA, valve position represented by a variable current signal in the range of 4-20 mA, valve temperature represented by a variable resistance or voltage signal, acceleration measurements along one or more axes, and an optional acoustic emission signal represented by a variable current signal in the range of 4-20 mA. The data acquisition unit(s) 17 can process and format these electrical sensor signals (for example, employing analog-to-digital conversion, data conditioning or quality control, data decimation, data aggregation, data buffering, event detection, data timestamping, and data formatting) into time-series sensor data for supply to the gateway device 21 located at the facility.

In embodiments, the operations of the sensors 15 and the data acquisition unit(s) 17 can be performed independently of any control operations or system that controls the actuation of the corresponding valve 11. Instead, the sensors 15 and the data acquisition unit(s) 17 can be used solely for operational surveillance and monitoring. Since the monitoring functionality is not part of the control system, it is not involved and does not affect the process or operations of the safety protocols and measures already established for such valves. It also means that the reliability of the process control and valve operation is not affected by the reliability of the monitoring functionality since these two functions are decoupled from one another.

In embodiments, the sensors 15 can be installed on the valve 11 in a manner that does not interact with any actuator or any control system. Instead, the sensors 15 can be installed to monitor the operating states or conditions of the valve 11. Furthermore, the sensors 15 can be configured so as to be non-intrusive to the operation of the valve 11 or the valve actuator and not create additional potential leak points or have any parts that could interfere with the valve actuator and valve operation. In this manner, the sensors 15 do not degrade the reliability of the valve actuator system and the valve. Furthermore, the acquisition of the sensor signals by the corresponding data acquisition unit 17 need not rely on any physical actuation trigger, as the data acquisition unit 17 can be configured to detect activity or valve movement and also differentiate from other events or false activities (plant and valve control system shutdown for instance) from the sensor signals. Finally, the data acquisition unit 17 can be mounted on the corresponding valve 11 without requiring disassembly or intervention in a shop to be retrofitted with these sensors 15. They can be mounted on an existing valve on-site.

In embodiments, the cloud-computing platform 25 can embody one or more cloud services or applications that analyze the time-series sensor data in order to optimize valve operation for increased operating lifetime, health condition detection, and predictive analytics. The cloud services or applications can also include a front-end interface for status communication and/or prognosis and health management (PHM). Having this intelligence generated in and accessible remotely from the facility in the cloud offers several advantages compared to having such processing performed locally at the facility, including the ability to update the analysis algorithms when they improve over time with additional collected data, compared to the case where every single edge unit would need a new firmware or algorithm upload.

In embodiments, the cloud computing platform 25 can embody one or more cloud services or applications that receive and store sensor data acquired from the sensors 15 over time and communicated to the cloud computing platform 25 via the data acquisition unit(s) 17 and gateway 21. This can be critical for event investigation or debugging.

In embodiments, the data acquisition unit 17 can be configured to process the sensor signals supplied by the sensors 15 of a corresponding valve 11 to extract sensor signal data corresponding to one or more actuation events or time intervals when a valve is being actuated (for example, when opening, closing, or otherwise changing position). In embodiments, the sensor signals supplied by the sensors 15 to the data acquisition unit 17 can be indicative of actuator pressure, actuator position (longitudinal position and/or rotational position in case of rotating movement), valve temperature, three-axis acceleration of the valve, and possibly acoustic measurements performed on the valve. One or more of the sensor signals (such as actuator pressure and actuator position) can be processed to detect actuation events or time intervals corresponding to a time period when a valve is being actuated (for example, when opening, closing or otherwise changing position), and the sensor signals can be further processed to extract certain sensor data corresponding to a detected actuation event or time interval (such as the extraction of high frequency three-axis acceleration data of the valve acquired for the time interval corresponding to a detected valve actuation event). The extracted sensor data can be included in the time-series sensor data forwarded by the data acquisition unit 17 to the gateway 21. Certain sensor data that falls outside any detected valve actuation event (such as high frequency three-axis acceleration data of the valve acquired for a time interval that does not fully encompass or overlaps the time period of a detected valve actuation event) can be filtered out and discarded such that it is not included in the time-series sensor data forwarded by the data acquisition unit 17 to the gateway 21. Other adaptions of the filtering of the sensor data can be employed, if desired.

In embodiments, the data acquisition unit 17 can be configured to process the sensor signals supplied by the sensors 15 continuously over time chunks of a predefined time interval (such as x minutes). An algorithm can be applied to the sensor data collected for each time chunk to detect if the sensor data corresponds to a valve actuation event. If the algorithm detects that the sensor data for the time chunk corresponds to a valve actuation event (for example, where the sensor data for the time chuck fully encompasses or overlaps the time period for a detected valve actuation event), certain sensor data corresponding to the time chunk (such as high frequency three-axis acceleration data of the valve acquired for the time chunk) can be extracted and included in the time-series sensor data forwarded by the data acquisition unit 17 to the gateway 21, which forwards the time-series sensor data to the cloud computing platform 25. If the algorithm detects that the sensor data for the time chunk does not correspond to a valve actuation event (for example, where the sensor data for the time chuck does not fully encompass or overlap the time period for a detected valve actuation event), certain sensor data corresponding to the time chunk (such as high frequency three-axis acceleration data of the valve acquired for the time chunk) can be filtered out and discarded such that is not part of the time-series sensor data forwarded by the data acquisition unit 17 to the gateway 21 and then to the cloud computing platform 25. Other adaptions of the filtering of the sensor data can be employed, if desired.

In embodiments, the cloud computing platform 25 can analyze the time-series data communication from the data acquisition unit(s) 17 and gateway 21 at a facility in order to provide indicators or insights on health monitoring and prognostics for the corresponding valves used at the facility. In embodiments, such indicators can include three different types of indicators as shown in FIG. 4 as follows:

monitoring system indicators (Acquisition System in FIG. 4): this indicator type provides information on the data acquisition and processing at the facility, and can provide an alert if a data acquisition system 17 is down or experiencing technical issues valve control indicators (Control System in FIG. 4): this indicator type provides information regarding how the valves are being operated, and can possibly monitor three aspects relevant to valve operation:

a. Applied pressure on the valve when closed. If the pressure is too high, this can accelerate wear and damage of the valve actuator or drive train.

b. Actuation speed: The valve actuation (opening or closing) has to happen slowly enough to avoid violent movement and damage to the valve actuator and the valve seat. This valve actuation speed is typically controlled by the pneumatic control system settings. By monitoring actuation time, the operator user can quickly identify if there is a bad setting potentially leading up to a dangerous or damaging situation for the valve.

c. Leak detection: possible air leaks at the valve actuator.

Valve health indicators (Valve Health in FIG. 4): this indicator type provides information that informs the operator user about the valve health and estimated remaining useful life of the valve.

Figure 5:
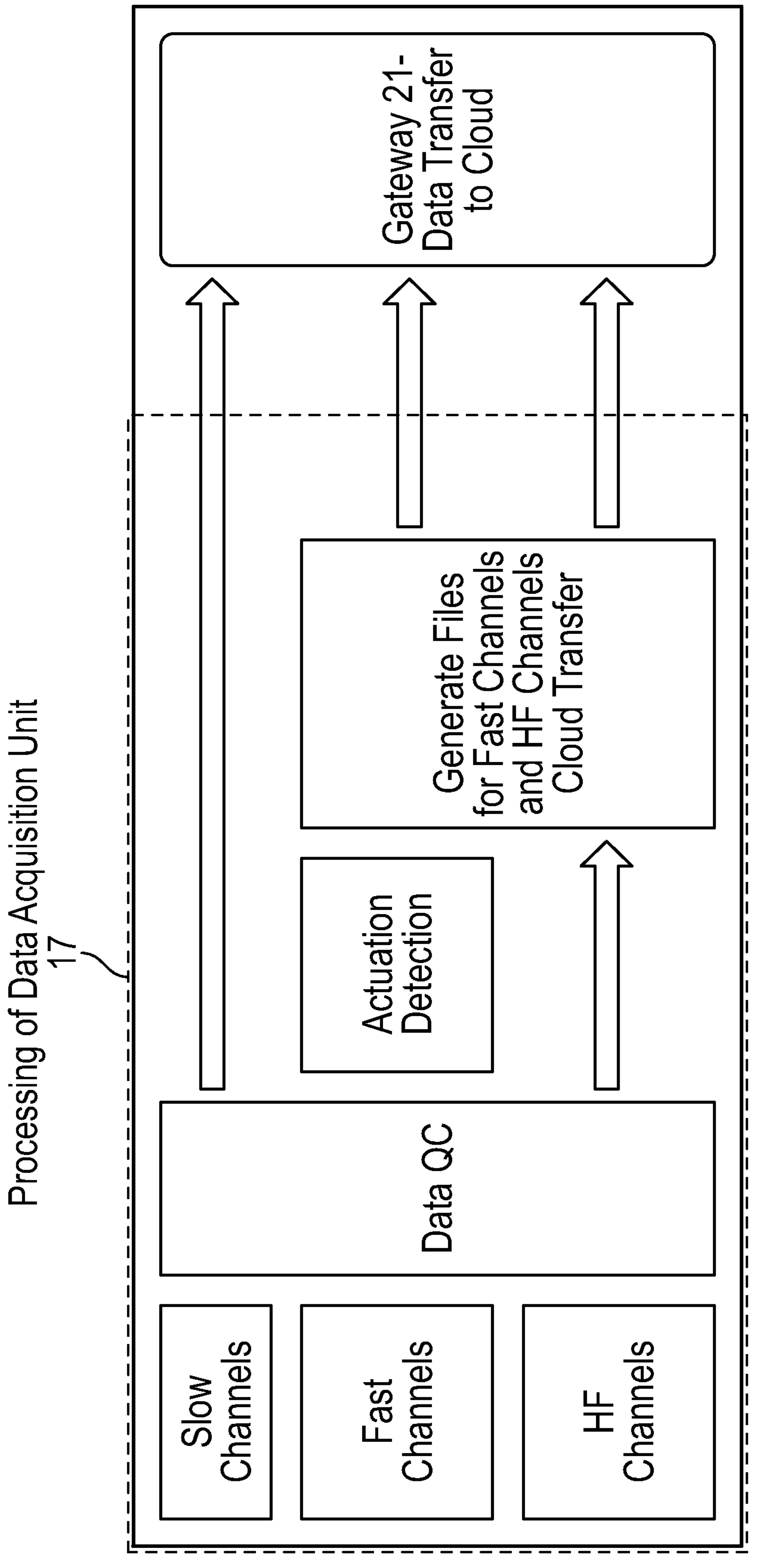
FIG. 5 is a high-level schematic diagram of processing operations that can be performed by the data acquisition unit(s) of FIGS. 1 to 3.

In embodiments, the data acquisition unit 17 can be configured to process the sensor signals supplied by the sensors 15 as shown in the schematic diagram of FIG. 5, where the data acquisition unit 17 acquires different sensor signals (or data tags) at different frequencies. For example, valve temperature data can be acquired at a frequency of 1 Hz (one measurement per second), which is part of the slow channel data in FIG. 5. Such acquisition can involve sampling the valve temperature sensor signal at a frequency of 1 Hz and converting the sampled valve temperature to a corresponding valve temperature data value by analog-to-digital conversion. In another example, actuator pressure and actuator position can be acquired a frequency of 30 Hz, which is part of the fast channel data in FIG. 5. Such acquisition can involve sampling the valve actuator pressure and actuator position sensor signals at a frequency of 30 Hz and converting the sampled valve actuator pressure and actuator position to corresponding valve actuator pressure and actuator position data values by analog-to-digital conversion. In yet another example, three-axis acceleration of the valve can be acquired at a frequency of 2.8 kHz, which is part of the high frequency or HF channel data in FIG. 5. Such acquisition can involve sampling the three-axis valve acceleration signals at a frequency of 2.8 kHz and converting the sampled three-axis valve acceleration to corresponding three-axis valve acceleration data values by analog-to-digital conversion. In embodiments, the different types of channel data are not processed in the same way due to the difference in acquisition frequencies as well as the bandwidth limitations and transmission costs between the gateway 21 and the cloud computing system 25. More specifically, the gateway 21 cannot continuously transfer the high frequency channel data to the cloud computing system 25 due to bandwidth limitations and transmission costs. Instead, continuous data transfer is limited to the slow channel data due to bandwidth limitations and transmission costs.

Figure 6:
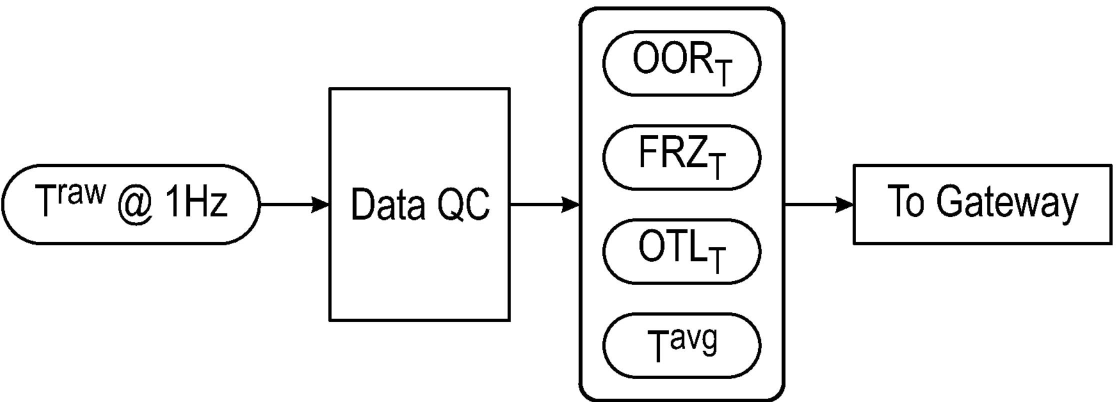
FIG. 6 is a schematic diagram of processing operations that can be performed by the data acquisition unit(s) of FIGS. 1 to 3 on slow channel (low frequency) sensor data that characterizes valve temperature.

In embodiments, the data acquisition unit 17 can be configured to process the slow channel data (which includes the valve temperature data $F^{raw}$ acquired at 1 Hz) as shown Compute the median value of the window: in FIG. 6. Such processing involves performing data quality control on the valve temperature data $F^{raw}$ before the data acquisition unit 17 forwards corresponding valve temperature tag data to the gateway 21, which forwards the valve temperature tag data to the cloud computing platform 25. The valve temperature tag data includes $OOR_T$, $FRZ_T$, $OTL_T$ and $T^{avg}$ values as provided by Tables 1 to 3 below.

Figure 7:
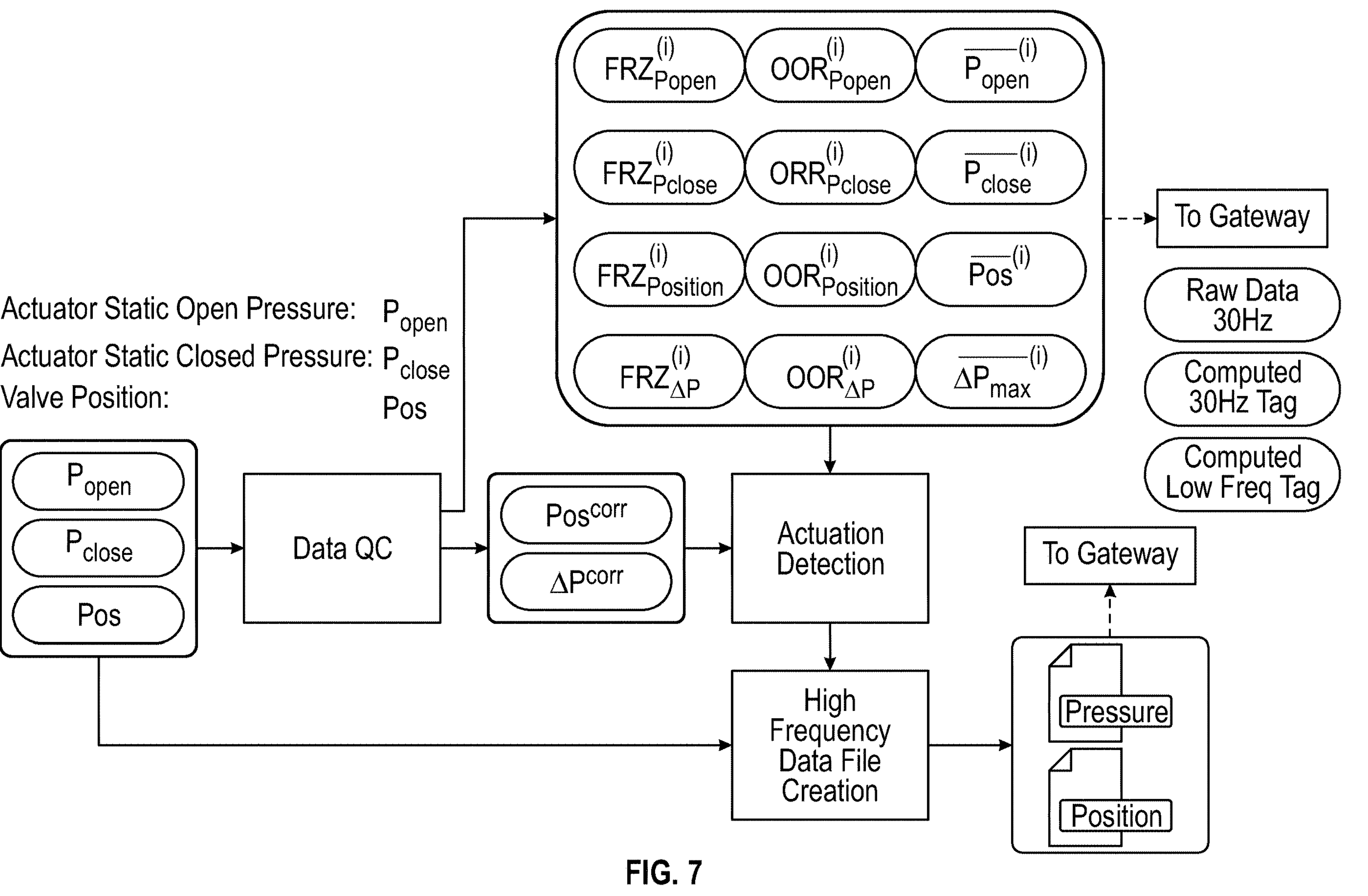
FIG. 7 is a schematic diagram of processing operations that can be performed by the data acquisition unit(s) of FIGS. 1 to 3 on fast channel sensor data that characterizes valve actuator pressure and position.
Figure 11:
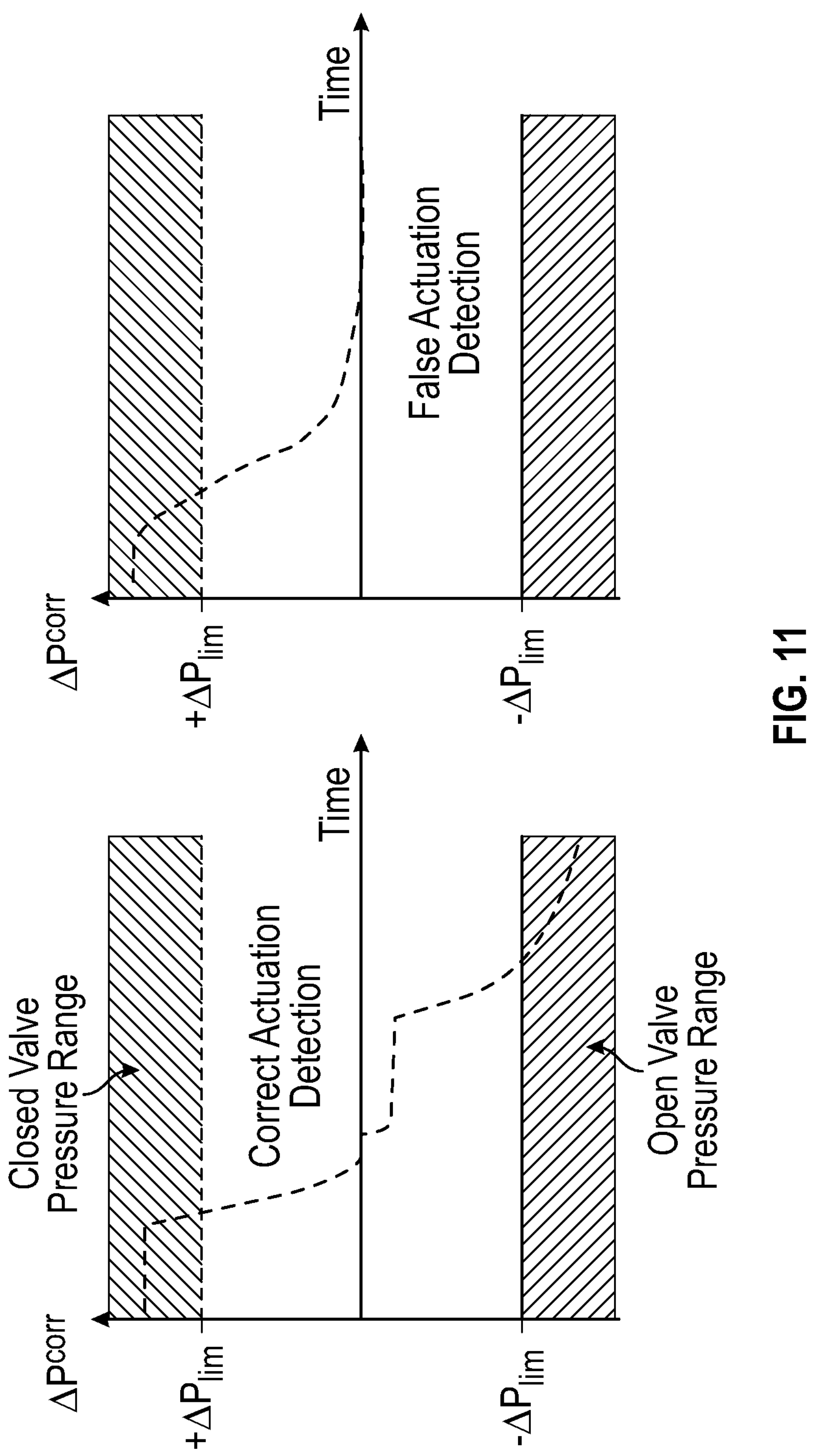
FIG. 11 is a diagram that illustrates correction of differential actuation pressure that can be used for detecting valve actuation events corresponding to a time period when a valve is being actuated (for example, when opening, closing, or otherwise changing position) according to the present disclosure.

In embodiments, the data acquisition unit 17 can be configured to process the fast channel data (which includes valve actuator pressure and actuator position acquired at 30 Hz) as shown in FIG. 7. Such processing involves performing data quality control on the valve actuator pressure and actuator position data before the data acquisition unit 17 forwards corresponding slow channel (low frequency) actuator pressure and actuator position tag data to the gateway 21, which forwards the slow channel (low frequency) actuator pressure and actuator position tag data to the cloud computing platform 25. The slow channel (low frequency) actuator pressure and actuator position tag data includes $OOR_{Popen}$, $OOR_{Pclose}$, $OOR_{Position}$, $OOR_{\Delta P}$, $FRZ_{Popen}$ open, $FRZ_{Pclose}$, $FRZ_{Position}$, $\overline{P_{open}}$, $\overline{P_{close}}$, $\overline{Pos}$, and $\Delta P^{max}$ values as provided by Tables 1 to 3 below. The data quality control can be configured to remove erroneous data that could give unpredictable results in actuation detection. The data acquisition unit 17 can be further configured to compute fast channel actuator position and actuator pressure tag values from the output of the data quality control for actuation detection. In embodiments, the computed fast channel actuator position and actuator pressure tag values include $Pos^{corr}$, $\Delta P^{corr}$ values, which represent corrected actuator position and actuator differential pressure tag values (see FIG. 11 and accompanying text below).

The data acquisition unit 17 can be further configured to process the slow channel (low frequency) actuator pressure and actuator position tag data and the computed fast channel actuator position and actuator pressure tag values for actuation detection, which involves detecting if and when the actuator position and actuator pressure tag values corresponds to a valve actuation event (i.e., a time period when the valve is being actuated). If so, the fast channel data (which includes actuator pressure and actuator position data acquired at 30 Hz) can be included in one or more data files that capture the detected valve actuation event, and the one or more data files are forwarded to the gateway 21, which forwards the one or more data files to the cloud computing platform 25.

Figure 8:
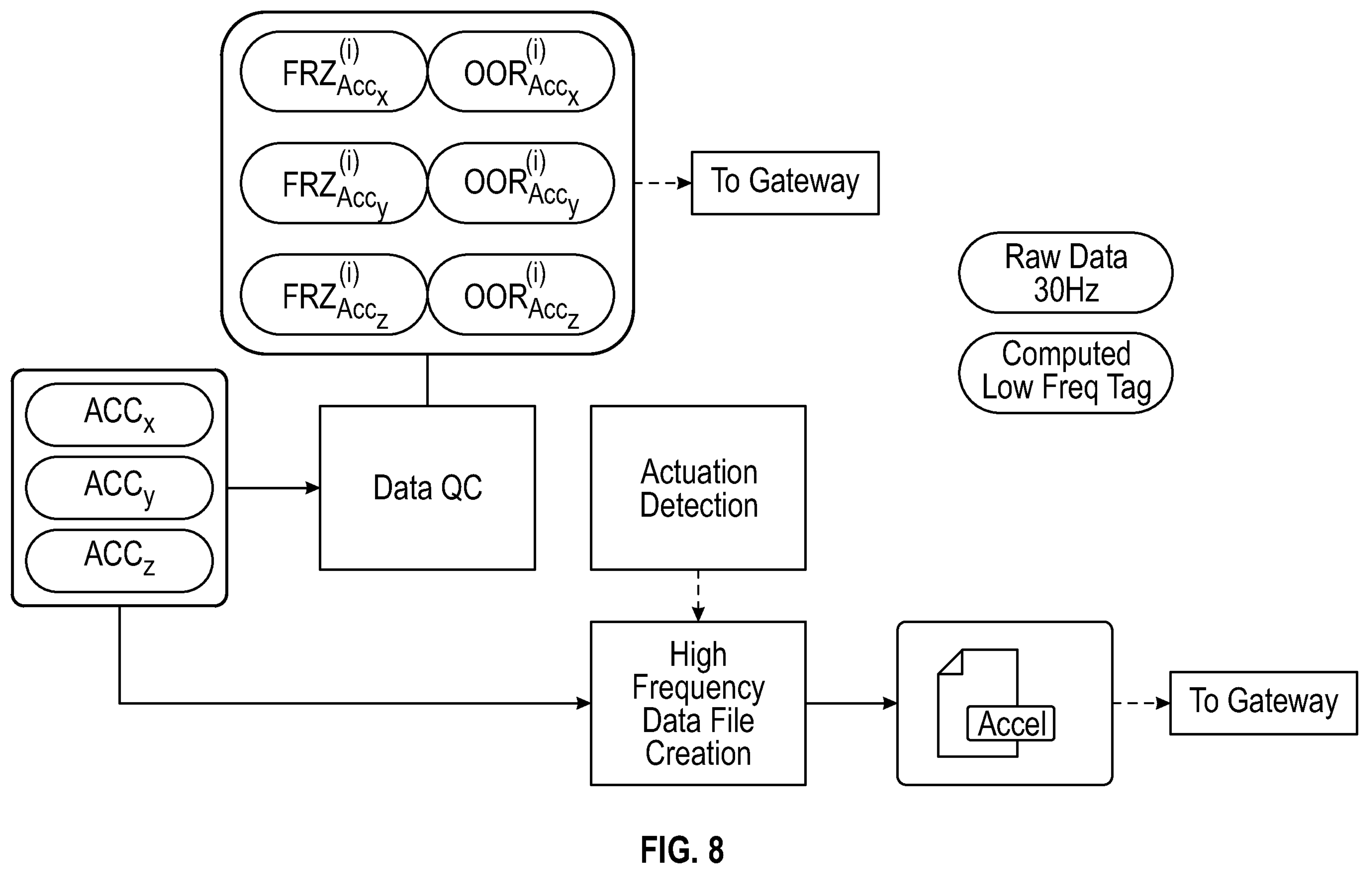
FIG. 8 is a schematic diagram of processing operations that can be performed by the data acquisition unit(s) of FIGS. 1 to 3 on high frequency channel sensor data that characterizes valve acceleration over three axes.

Furthermore, as shown in FIG. 8, if and when the actuator position and actuator pressure tag values corresponds to a valve actuation event, high frequency channel data (e.g., the three-axis acceleration data of the valve acquired at a frequency of 2.8 kHz) for the time period of the valve actuation event can be included in the one or more data files that capture the detected valve actuation event, and the one or more data files are forwarded to the gateway 21, which forwards the one or more data files to the cloud computing platform 25. Note that high frequency channel data (e.g., the three-axis acceleration data of the valve acquired at a frequency of 2.8 kHz) for time periods that do not correspond to a detected valve actuation event can be discarded and thus omitted from the one or more data files forwarded to the gateway 21. Furthermore, the data acquisition unit 17 can be configured to forward corresponding slow channel (low frequency) valve accelerometer tag data to the gateway 21, which forwards the slow channel (low frequency) valve accelerometer tag data to the cloud computing platform 25. The slow channel (low frequency) valve accelerometer tag data includes $OOR_{Accx}$, $OOR_{Accy}$, $OOR_{Accz}$, $FRZ_{Accx}$, $FRZ_{Accy}$, $FRZ_{Accz}$ values as provided by Tables 1 to 3 below.

In this manner, the data acquisition unit 17 communicates sensor data for the slow channel data (e.g., valve temperature data acquired at 1 Hz) to the gateway 21 for streaming to the cloud computing platform 25. The data acquisition unit 17 also communicates sensor data for the fast channel data (e.g., valve actuator pressure and valve position data acquired at 30 Hz) to the gateway 21 for streaming to the cloud computing platform 25. The data acquisition unit 17 performs data quality control on valve pressure and position data prior to running the algorithm for valve actuation detection in order to avoid processing erroneous data that could give unpredictable algorithm outcome. Also, some statistics or decimated data characterizing the valve actuator pressure and valve position is transferred continuously at the slow channel frequency (e.g., 1 Hz) to the gateway 21 for streaming to the cloud computing platform 25. Finally, high frequency channel data (e.g., the three-axis acceleration data of the valve acquired at a frequency of 2.8 kHz) for each detected valve actuation event can be included in one or more data files that capture the detected valve actuation event, and the one or more data files can be forwarded to the gateway 21, which forwards the one or more data files to the cloud computing platform 25. Note that high frequency channel data (e.g., the three-axis acceleration data of the valve acquired at a frequency of 2.8 kHz) for time periods that do not correspond to a detected valve actuation event can be discarded and thus omitted from the one or more data files forwarded to the gateway 21. When the data is received by cloud computing platform 25, it can be processed by the cloud computing platform 25 to provide the indicators described above with respect to FIG. 4.

Figure 9:
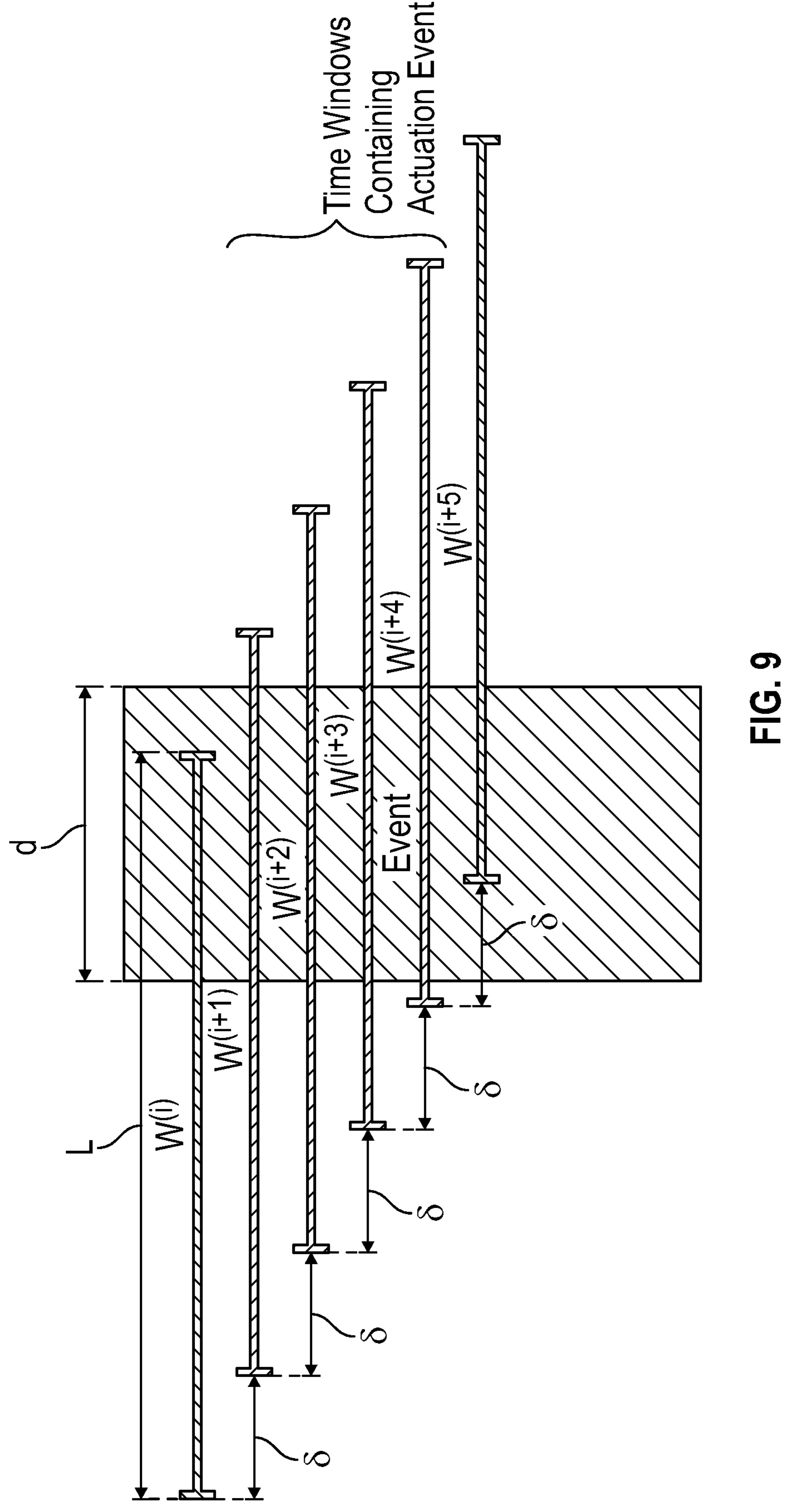
FIG. 9 is a schematic diagram of time windows that can be used for detecting valve actuation events corresponding to a time period when a valve is being actuated (for example, when opening, closing, or otherwise changing position) according to the present disclosure.
Figure 10:
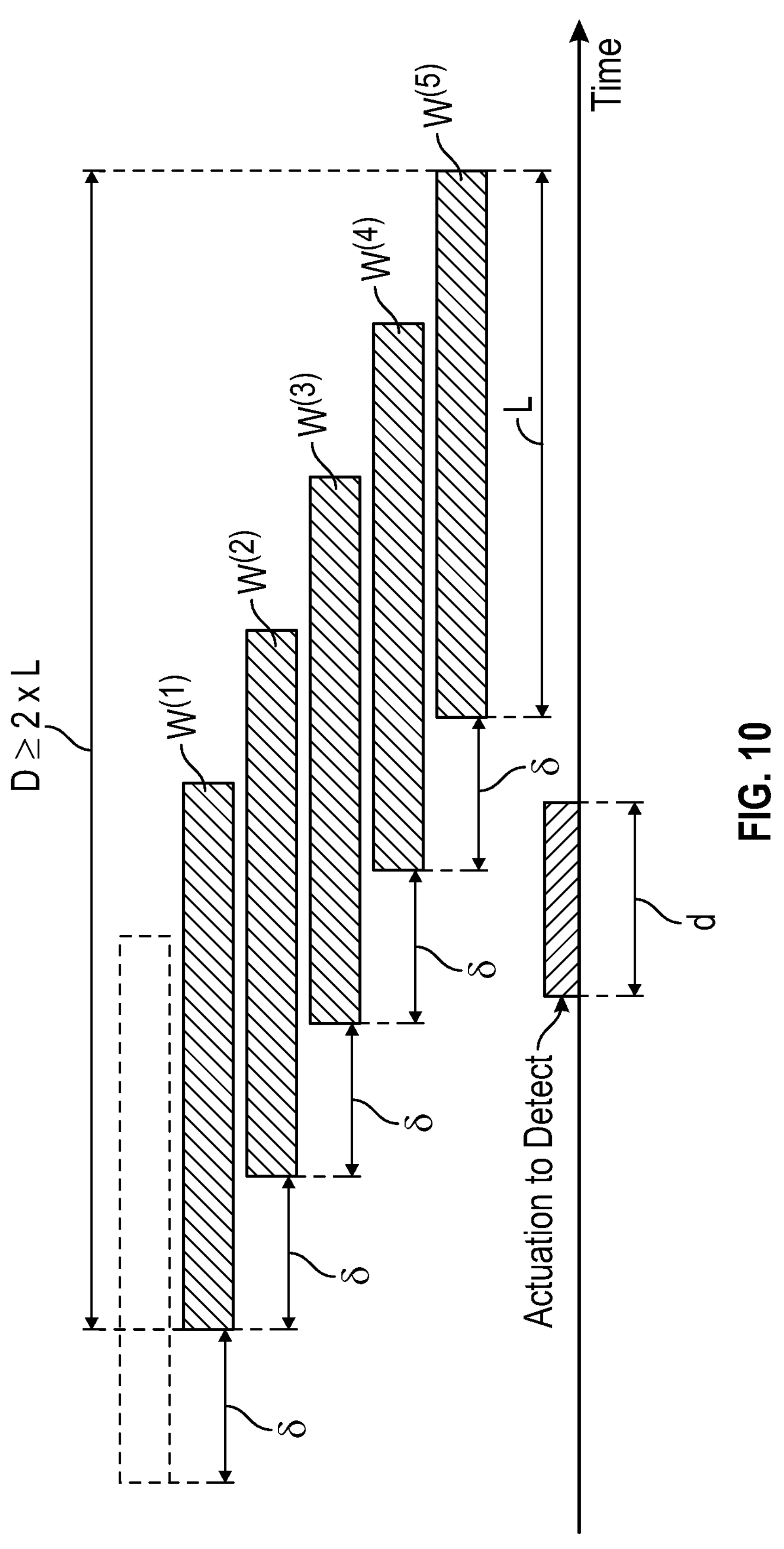
FIG. 10 is a schematic diagram of investigation windows that can be used for detecting valve actuation events corresponding to a time period when a valve is being actuated (for example, when opening, closing, or otherwise changing position) according to the present disclosure.

In embodiments, the data acquisition unit 17 can be configured to detect if the sensor data corresponds to a valve actuation event (i.e., a time period when the valve is being actuated) based on processing of data on successive time windows as illustrated in FIG. 9. This has the advantage of being less computation intensive than processing streaming data and performing live actuation detection at a frequency of 30 Hz. Successive processing windows must be long enough and numerous enough to make sure that the processing will be able to capture actuation events in their entirety. With:

L: duration (in seconds) of investigation window d: recommended actuation duration (in seconds)

δ: time delay (in seconds) between two consecutive investigation windows

The following relationship ensures that the window duration (L) is long enough and time delay is short enough so that all valve actuation events are captured entirely where the window duration fully encompasses and covers the time duration of the valve actuation event as follows:

$$L \geq s \times d + \delta$$

A default value of δ=60 sec. This corresponds to the frequency at which low frequency data is transmitted to the cloud computing system 25. Matching time delay to that frequency minimizes the processing requirements. A default value of d=150 sec is also proposed for the largest actuator. In order to be able to detect defective actuations a safety factor on the actuation duration is set to 2, meaning that we assume we want to be able to capture an actuation that will last 2 time 150 sec or 300 sec. Note that s is a safety factor and L will be set to 360 sec. It corresponds to L=s×d+δ with s being a safety factor of 2.

Error! Reference source not found. illustrates the relationship between L, d and δ. Note that $w^{(i)}$ represents successive investigation windows. This figure illustrates that several consecutive windows encapsulate a valve actuation event while two other cover only partially the valve actuation event. The window $w^{(i)}$ can be referred to as investigation window below.

In embodiments, the data acquisition unit 17 can be configured to perform data quality control operations on the fast channel sensor data ($P_{open}$, $P_{close}$, Pos) over the investigation window $w^{(i)}$ as follows.

Output of QC Operations:

Frozen and out of range data rates over investigation window $w^{(i)}$ for each raw tag $$FRZ^{(i)}_{P_{open}}, OOR^{(i)}_{P_{open}}, FRZ^{(i)}_{P_{close}}, OOR^{(i)}_{P_{close}}, FRZ^{(i)}_{Pos}, OOR^{(i)}_{Pos}, FRZ^{(i)}_{\Delta P}, OOR^{(i)}_{\Delta P}$$

plus the computed differential pressure tag ΔP.

Decimated tag values at 1/min:

$\overline{P_{open}}^{(i)}, \overline{P_{close}}^{(i)}, \overline{Pos}^{(i)}, \overline{\Delta P_{max}}^{(i)}$ Corrected tag data at 30 Hz:

$$P^{corr}_{open}, P^{corr}_{close}, Pos^{corr}, \Delta P^{corr}$$

Processing Steps for the QC Operations 1.1.1.1. Check for Out of Range Values 1.1.1.1.1. For Raw Channels ($P_{open}$, $P_{clos}$, Pos, T, Acc):

For each data point in the investigation window $w^{(i)}$ for each tag, check if it is in a range defined by min and max values specified for this tag. Calculate over the window $w^{(i)}$ the proportion of out of range data. The value for that window is $$OOR^{(i)}_{Tag} = \frac{N_{OOR}}{L \times f}$$

With $N_{OOR}$ representing the number of data points of the investigation window $w^{(i)}$ that are out of range.

1.1.1.1.2. For Differential Pressure Channel (ΔP):

A new differential pressure channel will be created. As this channel will be used for actuation detection, QC statistics are calculated in order to avoid processing poor quality data.

A particular data point $x^{(n)}$ in the time window is considered to have is ΔP value flagged as out or range if either the either $P_{open}$ or $P_{close}$ value for that data point is out of range. The out of range data rate for the ΔP channel is determined the same way as for the raw channels:

$$OOR^{(i)}_{\Delta P} = \frac{N_{OOR}}{L \times f}$$

With $N_{OOR}$ being the number of out or range data point of ΔP channel in the current investigation window $w^{(i)}$.

1.1.1.2. Check for Frozen Data 1.1.1.2.1. For Raw Channels ($P_{open}$, $P_{close}$, Pos, T, Acc):

For each data point tag value $x^{(n)}$ of the time window $w^{(i)}$, calculate the standard deviation of the ensemble of points: $\sigma^{(n)}=[x^{(n-n_F+1)}, x^{(n-n_F+2)}, \ldots, x^{(n)}]$ with $n_F$ being the number of consecutive data. If $\sigma^{(n)}=0$, then the data point tag value $x^{(n)}$ is frozen.

In the simple default case where $n_F=2$, it is easier to perform the following check rather than computing the standard deviation.

$$x^{(n-1)} = x^{(n)}$$

If the above property is true, $x^{(n)}$ is flagged as frozen.

After all points for each tag in the investigation window $w^{(i)}$ have been checked for frozen, the rate of frozen data point is calculated as:

$$FRZ^{(i)}_{tag} = \frac{N_{frozen}}{L \times f - (n_F - 1)}$$

with $N_{frozen}$ being the number of detected frozen data points, f is the frequency (30 Hz) and $L \times f-(n_F-1)$ is the total number of data points per tag in the investigation window $w^{(i)}$ that are check for frozen data.

1.1.1.2.2. For Differential Pressure Channel (ΔP):

A point $P^{(n)}$ in the investigation window $w^{(i)}$ has its differential pressure channel value considered as frozen if either $P_{open}$ or $P_{close}$ for that data point is frozen.

The frozen data rate for the ΔP channel is determined the same way as for the raw channels:

$$FRZ^{(i)}_{\Delta P} = \frac{N_{frozen}}{L \times f - (n_F - 1)}$$

With $N_{frozen}$ being the number of frozen data point of ΔP channel in the current investigation window $w^{(i)}$.

1.1.1.3. Check for Outlier Using a Hampel Filter ($P_{open}$, $P_{clos}$, Pos, T)

The data points of the investigation window $w^{(i)}$ will be tested for outliers. Though the first 3 and last 3 points of the window cannot be tested as they are on the edge of the window. They will not be corrected either. For the other data points of the window, if one is flagged as an outlier, it will be replaced by a new value as defined in the algorithm below. For outlier detection and replacement on data point tag value $x^{(n)}$:

Create a window containing 7 consecutive data points:

$$H^{(n)} = \left[x^{(n-3)}, x^{(n-2)}, x^{(n-1)}, x^{(n)}, x^{(n+1)}, x^{(n+2)}, x^{(n+3)}\right]$$

The window of 7 consecutive values must be taken from the raw time-series data. It must not contain corrected values from the corrected time-series data $$P^{corr}_{open}, P^{corr}_{close}, Pos^{corr}$$

$$med^{(n)} = \text{median}\left(H^{(n)}\right)$$

Calculate the median of the absolute deviation from the median for each point in $H^{(n)}$ $$MAD^{(n)} = \text{median}\left(\left|x^{(n-3)} - med^{(n)}\right|, \left|x^{(n-2)} - med^{(n)}\right|, \ldots, \left|x^{(n+3)} - med^{(n)}\right|\right)$$

Calculate estimated standard deviation using $MAD^{(n)}$:

$$\hat{\sigma}^{(n)} = \kappa \times MAD^{(n)} \text{ with } \kappa = 1.4826$$

$x^{(n)}$ is considered an outlier if:

$$\left|x^{(n)} - med^{(n)}\right| > t_0 \times \hat{\sigma}^{(n)} \text{ with } t_0 \text{ being a set threshold (default value = 5)}$$

If $x^{(n)}$ is an outlier, its value is replaced with $med^{(n)}$ in the corrected time-series data ($Tag^{corr}$)

The output is an investigation window containing data points (raw, or corrected if detected as outliers). Pressure and position raw data channels are processed and have their outliers replaced. This generates a corrected data set for each channel for the investigation window $$w^{(i)}: P_{open}^{corr}, P_{close}^{corr}, Pos^{corr}.$$

The rate of outliers over 1 min will be computed also. In the case of temperature or accelerometer channels, the objective is not to correct the data and generated corrected T or Acc channels, but only to compute the rate of outliers over 1 min.

1.1.1.4. Calculate the Differential Actuator Pressure Channel ΔP

A new 30 Hz channel is created for the differential pressure across the actuator using raw data $$P_{open}^{corr} \text{ and } P_{close}^{corr}: \Delta P = P_{close}^{corr} - P_{open}^{corr}$$

1.1.1.5. Create decimated value at 1/min

These QC operations will also create decimated value that will be transmitted to the gateway at low frequency (1/min).

$\overline{P_{open}}^{(i)}$ is the average value of $$P_{open}^{corr}$$

over the investigation window $w^{(i)}$ $\overline{P_{close}}^{(i)}$ is the average value of $$P_{close}^{corr}$$

over the investigation window $w^{(i)}$ $\overline{Pos}^{(i)}$ is the average value of $Pos^{corr}$ over the investigation window $w^{(i)}$ $\overline{\Delta P_{max}}^{(i)}$ is the maximum value of the actuator differential pressure $$\left(P_{close}^{corr} - P_{open}^{corr}\right)$$

over the investigation window $w^{(i)}$ $$\overline{\Delta P_{max}}^{(i)} = \text{Max}\big|_{w^{(i)}}\left(P_{close}^{corr} - P_{open}^{corr}\right)$$

In embodiments, the data acquisition unit 17 can be configured to detect if the sensor data corresponds to a valve actuation sequence (i.e., a point in time when the valve is being actuated) by identifying which investigation window potentially contains a valve actuation. This requires analyzing several consecutive investigation windows as follows.

Processing Steps for the Valve Actuation Detection 2.1.1.1 Number of Consecutive Investigation Window to Survey for Actuation Detection For each investigation window, two channels are analyzed to search for a possible valve activity: $Pos^{corr}$ and $\Delta P^{corr}$. Activity detection is realized by computing the standard deviation of these channels over each investigation window $w^{(i)}$ $$-\sigma_{Pos}^{(i)} = \text{Standard deviation}(Pos^{corr}) \text{ over window } w^{(i)}$$

$$-\sigma_{\Delta P}^{(i)} = \text{Standard deviation}(\Delta P^{corr}) \text{ over window } w^{(i)}$$

The number of consecutive investigation windows n is such that they cover a time period of at least 2×L, (L being the duration of an investigation window) as illustrated on Error! Reference source not found.: Number of investigation windows $$n = 1 + \text{int}\left(\frac{L+1}{\delta}\right)$$

2.1.1.2 Detection of Actuation and Identification of which Window Contains it

The logical steps used for identifying the investigation window containing an actuation are the followings:

Monitor/record data until enough new data points are collected for a new time window.

Update the list of time windows $[w^{(1)}, w^{(2)}, \ldots, w^{(n)}]$, representing the last (n) time windows.

For the last (new) time window $w^{(n)}$, compute the following:

$$\sigma_{Pos}^{(n)} \text{ and } \sigma_{\Delta P}^{(n)}:$$

position and differential pressure standard deviations

Over the combined last n investigation windows (over duration D), calculate the following:

Rates of errors $OOR_{Pos}$ and $FRZ_{Pos}$ for Pos channel

Rates of errors $OOR_{\Delta P}$ and $FRZ_{\Delta P}$ for differential pressure channel Determine which channel to use for valve actuation detection If $$OOR_{Pos} < OOR_{Pos}^{Max} \text{ and } FRZ_{Pos} < FRZ_{Pos}^{Max}:$$

detect actuation using Pos channel

Else, If $$OOR_{\Delta P} < OOR_{\Delta P}^{Max} \text{ and } FRZ_{\Delta P} < FRZ_{\Delta P}^{Max}:$$

detect actuation using ΔP channel

Else: no actuation detection (both channels have too many errors to detect an actuation)

Assuming that the position channel has been selected for detecting the actuation:

An actuation is contained within the last n investigation windows If:

$$\sigma_{Pos}^{(n)} < \sigma_{Pos}^{lim} \text{ AND } \sigma_{Pos}^{(n-1)} \geq \sigma_{Pos}^{lim} \text{ with } \sigma_{Pos}^{lim}$$

σis the activity detection threshold set on the position channel

The investigation window that contains the actuation is the one that with the maximum value of $$\sigma_{Pos}^{(i)}.$$

This value is to be searched among the windows:

$$\left[\sigma_{Pos}^{(1)}, \sigma_{Pos}^{(2)}, \ldots, \sigma_{Pos}^{(n-1)}\right]$$

(the last one or window $w^{(n)}$ cannot contain the actuation)

If the differential pressure channel is selected for detecting actuation (due to a too high error rate on the position channel), the process is the same:

An actuation is contained within the last n investigation windows If:

$$\sigma_{\Delta P}^{(n)} < \sigma_{\Delta P}^{lim} \text{ AND } \sigma_{\Delta P}^{(n-1)} \geq \sigma_{\Delta P}^{lim} \text{ with } \sigma_{\Delta P}^{lim}$$

is the activity detection threshold for the differential pressure channel

The investigation window that contains the actuation is the one that with the maximum value of $$\sigma_{\Delta P}^{(i)}.$$

This value is to be searched among the windows:

$$\left[\sigma_{Pos}^{(1)}, \sigma_{Pos}^{(2)}, \ldots, \sigma_{Pos}^{(n-1)}\right]$$

(the last one or window $w^{(n)}$ cannot contain the actuation)

In order to avoid a possible double detection of the actuation, once an investigation window $w^{(i)}$ from $[w^{(1)}, w^{(2)}, \ldots, w^{(n)}]$ is identified as containing an actuation, the standard deviation values $$\sigma_{Pos}^{(i)} \text{ and } \sigma_{\Delta P}^{(i)}$$

for all windows within $[w^{(1)}, w^{(2)}, \ldots, w^{(n)}]$ are set to 0.

2.1.1.3 Basic Checks on Identified Possible Valve Actuation

A few simple checks are performed on the channel used for actuation detection on the investigation window that potentially contains an actuation. The goal of these basic checks is to sort out quickly a real actuation from another event that would have generated activity on the line.

2.1.1.3.1 Check Using the Position Channel

If the Position channel is used for detecting an actuation, the following check is performed:

$$\left|Pos^{corr(m)} - Pos^{corr(1)}\right| > S_{mini}$$

with $Pos^{corr(m)}$ and $Pos^{corr(1)}$ being respectively the last and first position data point of the investigation window and $S_{mini}$ is minimum travel distance that must be recorded so that the actuation is considered as valid.

The value of $S_{mini}$ must be defined for each valve [size x class].

2.1.1.3.2 Check Using the Differential Pressure

If the differential pressure channel is used, the detected actuation is considered valid only if the value of $\Delta P^{corr}$ evolves from a range of pressure values to another one.

If the valve is opening, the first range is representative of differential pressures for a closed valve while the second range is representative of differential pressures for an open valve. If the valve is closing, the ranges are inverted. See Error! Reference source not found. for illustration.

These ranges can be defined as follows:

Closed position pressure range: $\Delta P^{corr} \geq \Delta P_{lim}$

Open position pressure range: $\Delta P^{corr} \leq -\Delta P_{lim}$

The value of $\Delta P_{lim}$ must be defined and is dependent on the actuator type and possible installation settings.

TABLE 1

Tags and flags definition

| Tag | Definition | Frequency | Tag | Definition | Frequency |
|---|---|---|---|---|---|
| $P_{open}$ | Open pressure (raw) | 30 Hz | $OOR_{P_{open}}^{(i)}$ | Rate of out of range Open pressure data | 1/min |

TABLE 1-continued

| Tag | Definition | Frequency | Tag | Definition | Frequency |
|---|---|---|---|---|---|
| Tags and flags definition | | | | | |
| $P_{close}$ | Close pressure (raw) | 30 Hz | $FRZ_{P_{open}}^{(i)}$ | Rate of frozen Open pressure data | 1/min |
| Pos | Position (raw) | 30 Hz | $OOR_{P_{close}}^{(i)}$ | Rate of out of range Closed pressure data | 1/min |
| $\Delta P$ | Differential pressure | 30 Hz | $FRZ_{P_{close}}^{(i)}$ | Rate of frozen Closed pressure data | 1/min |
| $P_{open}^{corr}$ | Open pressure corrected for outliers | 30 Hz | $OOR_{Pos}^{(i)}$ | Rate of out of range Position data | 1/min |
| $P_{close}^{corr}$ | Close pressure corrected for outliers | 30 Hz | $FRZ_{Pos}^{(i)}$ | Rate of frozen Position data | 1/min |
| $Pos^{corr}$ | Position corrected for outliers | 30 Hz | $OOR_{\Delta P}^{(i)}$ | Rate of out of range differential pressure data | 1/min |
| $\overline{P_{open}}^{(i)}$ | Sample open pressure at 1/min | 1/min | $FRZ_{\Delta P}^{(i)}$ | Rate of frozen differential pressure data | 1/min |
| $\overline{P_{close}}^{(i)}$ | Sample close pressure at 1/min | 1/min | $flag\_actu_{Pos}^{(i)}$ | Valve actuation flag determine using position data | 1/min |
| $\overline{Pos}(i)$ | Sample position at 1/min | 1/min | $flag\_actu_{\Delta P}^{(i)}$ | Valve actuation flag determined using differential pressure data | 1/min |
| $\overline{\Delta P_{max}}^{(i)}$ | Max recorded value of differential pressure (Close-Open) | 1/min | $w_{actu}^{(i)}$ | Detected actuation time window | 1/min |
| $FRZ_{Acc_x}^{(i)}$ | Rate of frozen x-axis acceleration data | 1/min | $OOR_{Acc_x}^{(i)}$ | Rate of out of range x-axis acceleration data | 1/min |
| $FRZ_{Acc_y}^{(i)}$ | Rate of frozen y-axis acceleration data | 1/min | $OOR_{Acc_y}^{(i)}$ | Rate of out of range y-axis acceleration data | 1/min |
| $FRZ_{Acc_z}^{(i)}$ | Rate of frozen z-axis acceleration data | 1/min | $OOR_{Acc_z}^{(i)}$ | Rate of out of range z-axis acceleration data | 1/min |

TABLE 2

| Reference | |
|---|---|
| Tag $P_{open}$, $P_{close}$, Pos | Raw data (30 Hz) |
| Tags $\Delta P$, $P_{open}^{corr}$, $P_{close}^{corr}$, $Pos^{corr}$ | Computed data (30 Hz) |

TABLE 2-continued

| Reference | |
|---|---|
| Tags remainder in Table 1 above | Computed data over an investigation window (1/min) |

TABLE 3

| Parameter | Definition | Default value |
|---|---|---|
| Processing parameters | | |
| L | Duration of investigation window | 360 sec |
| d | Max duration of actuation event | 150 sec |

TABLE 3-continued

| Processing parameters | | |
|---|---|---|
| Parameter | Definition | Default value |
| δ | Time spacing between the start of two consecutive investigation windows | 60 sec |
| n | Number of windows to analyze for actuation detection | 7 |
| $OOR_{Pos}^{Max}$ | Max allowable rate of out of range position data | 1% |
| $OOR_{\Delta P}^{Max}$ | Max allowable rate of out of range differential pressure data | 5% |
| $FRZ_{Pos}^{Max}$ | Max allowable rate of frozen position data | 1% |
| $FRZ_{\Delta P}^{Max}$ | Max allowable rate of frozen differential pressure data | 5% |
| $\sigma_{Pos}^{lim}$ | Activity detection threshold value for position standard deviation | Valve [size × class] dependent |
| $\sigma_{\Delta P}^{lim}$ | Activity detection threshold value for differential pressure standard deviation | Actuator dependent |
| $S_{mini}$ | Minimum valve stroke for validating a detected possible actuation | Valve [size × class] dependent |
| $\Delta P_{lim}$ | Threshold on differential pressure used for defining the limits of open and closed position differential pressure ranges | Actuator dependent |

Figure 12:
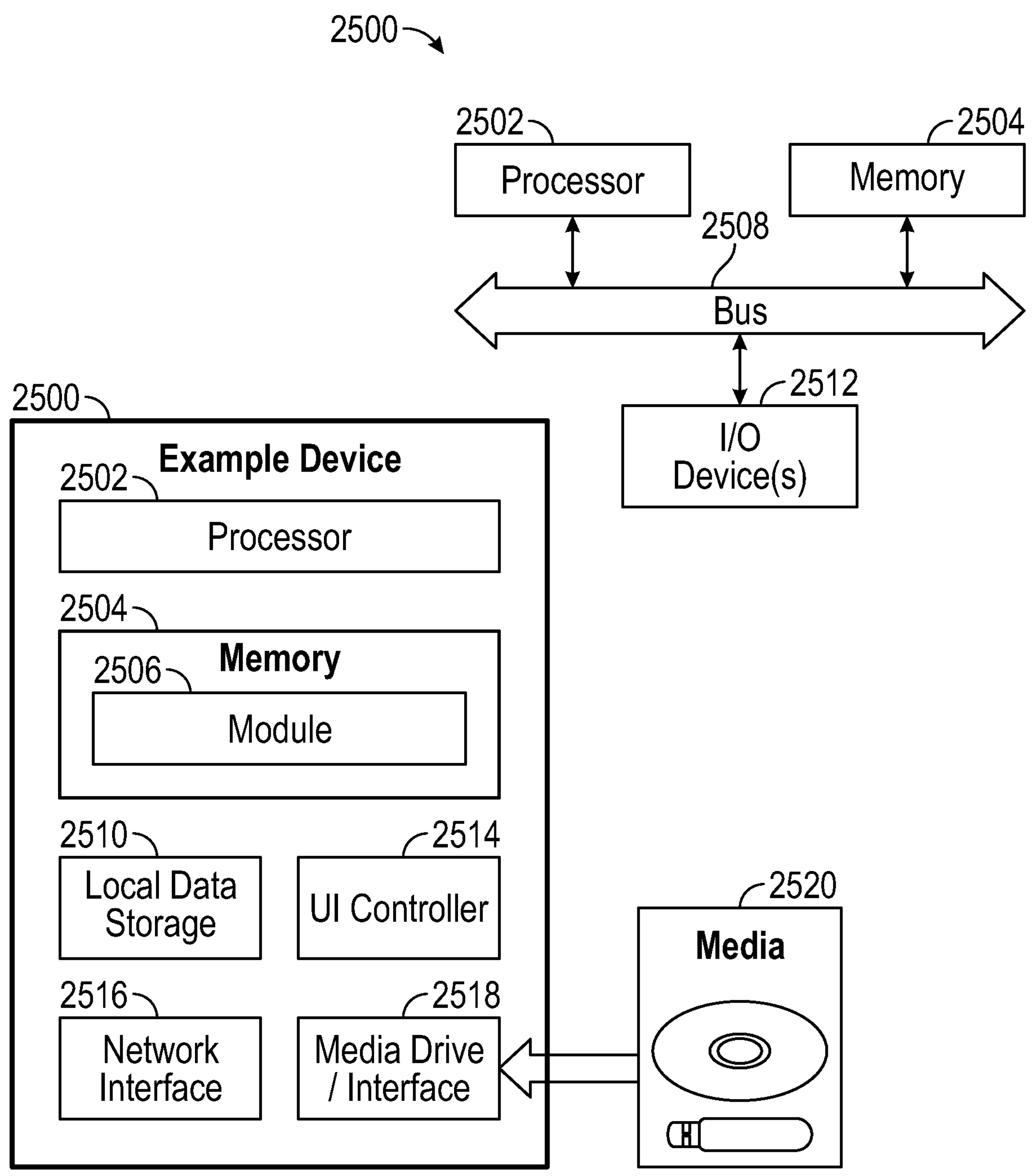
FIG. 12 is a functional block diagram of a computer processing system.

FIG. 12 illustrates an example device 2500, with a processor 2502 and memory 2504 that can be configured to implement various embodiments of the platform components, methods and workflows as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

There have been described and illustrated herein several embodiments of a distributed processing platform and related workflows that acquire, aggregate and process data generated by one or more valves at an industrial site. While particular embodiments of the invention have been described, it is not intended that the invention be limited thereto, as it is intended that the invention be as broad in scope as the art will allow and that the specification be read likewise. Thus, while particular system components and workflows have been disclosed for certain valve systems, it will be appreciated that such system components and workflows can be used for other valve systems as well. It will therefore be appreciated by those skilled in the art that yet other modifications could be made to the provided invention without deviating from its spirit and scope as claimed.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for monitoring operations of a valve at an industrial site, the system comprising:
- a cloud computing system located remotely from the industrial site;
- at least one sensor mounted on the valve at the industrial site, the at least one sensor including an acceleration sensor configured to acquire high-frequency valve acceleration sensor data corresponding to acceleration of the valve;
- a data acquisition unit located at the industrial site, the data acquisition unit including an interface to the at least one sensor; and
- a gateway device located at the industrial site that interfaces to the data acquisition unit and to the cloud computing system, the gateway device including:
  - a first interface to the data acquisition unit; and
  - a second interface to the cloud computing system,
- wherein the data acquisition unit is configured to:
  - receive at least one sensor signal supplied by the at least one sensor, and
  - process the at least one sensor signal to extract time-series sensor data for supply to the gateway device, the time-series sensor data including the high-frequency valve acceleration sensor data acquired by the acceleration sensor,
  - detect a valve actuation event based on sensor signals corresponding to valve actuation pressure and valve position, and
  - responsive to the detecting the valve actuation event:
    - selectively extract, from the high-frequency valve acceleration sensor data, valve acceleration sensor data corresponding in time to the valve actuation event,
    - discard high-frequency valve acceleration sensor data acquired during time intervals that do not correspond to the valve actuation event, and
    - supply the time-series sensor data to the gateway device, the time-series sensor data including, for the high-frequency valve acceleration sensor data, only
  - the selectively-extracted valve acceleration sensor data of the high-frequency valve acceleration sensor data,
- wherein the gateway device is configured to forward the time-series sensor data supplied by the data acquisition unit to the cloud computing system, and
- wherein the cloud computing system is configured to receive, store, and process the time- series sensor data communicated from the gateway device for remote monitoring of operation of the valve at the industrial site.

2. The system of claim 1, wherein the data acquisition unit is supported on the valve.

3. The system of claim 1, wherein the data acquisition unit is further configured to receive and process sensor signals that characterize valve actuation pressure and valve position to detect a valve actuation event.

4. The system of claim 1, wherein the valve acceleration sensor data is acquired as high-frequency sensor data at a sampling frequency of about 2.8 kHz.

5. The system of claim 4, wherein the valve acceleration sensor data represents valve acceleration in three orthogonal axes.

6. The system of claim 1, wherein the data acquisition unit is further configured to receive and process certain sensor signals supplied by the at least one sensor for supply as part of low-frequency time-series data forwarded to the gateway device.

7. The system of claim 6, wherein the low-frequency time-series data represents at least one of: temperature of the valve, decimated data characterizing at least one operating condition of the valve, or statistical data characterizing at least one operating condition of the valve.

8. The system of claim 1, wherein the cloud computing system is further configured to process the time-series sensor data to generate at least one indicator related to operation of the valve or operation of the system.

9. The system of claim 8, wherein the at least one indicator relates to at least one of: i) availability or quality of the operation of the system, ii) information on control of the valve, or iii) information on health of the valve or remaining useful like of the valve.

10. The system of claim 1, wherein the data acquisition unit operates independently from a control system located at the industrial site that controls actuation of the valve.

11. A method for monitoring operations of a valve at an industrial site, the method comprising:

providing a cloud computing system located remotely from the industrial site;

providing at least one sensor mounted on the valve at the industrial site, the at least one sensor including an acceleration sensor configured to acquire high-frequency valve acceleration sensor data corresponding to acceleration of the valve;

providing a data acquisition unit located at the industrial site, the data acquisition unit including an interface to the at least one sensor; and providing a gateway device located at the industrial site that interfaces to the data acquisition unit and to the cloud computing system, the gateway device including:

a first interface to the data acquisition unit; and a second interface to the cloud computing system, receiving, by the data acquisition unit, at least one sensor signal supplied by the at least one sensor;

processing, by the data acquisition unit, the at least one sensor signal to extract time-series sensor data for supply to the gateway device, the time-series sensor data including the high-frequency valve acceleration sensor data acquired by the acceleration sensor;

detecting, by the data acquisition unit, a valve actuation event based on sensor signals corresponding to valve actuation pressure and valve position;

responsive to the detecting the valve actuation event:

selectively extracting, by the data acquisition unit from the high-frequency valve acceleration sensor data, valve acceleration sensor data corresponding in time to the valve actuation event;

discarding, by the data acquisition unit, high-frequency valve acceleration sensor data acquired during time intervals that do not correspond to the valve actuation event; and supplying, by the data acquisition unit, the time-series sensor data to the gateway device, the time-series sensor data including, for the high-frequency valve acceleration sensor data, only the selectively-extracted valve acceleration sensor data of the high-frequency valve acceleration sensor data;

forwarding, by the gateway device, the time-series sensor data supplied by the data acquisition unit to the cloud computing system; and receiving, storing, and processing, by the cloud computing system, the time-series sensor data communicated from the gateway device for remote monitoring of operation of the valve at the industrial site.

12. The method of claim 11, further comprising receiving and processing, by the data acquisition unit, sensor signals that characterize valve actuation pressure and valve position to detect a valve actuation event.

13. The method of claim 11, wherein the valve acceleration sensor data is acquired as high-frequency sensor data at a sampling frequency of about 2.8 kHz.

14. The method of claim 13, wherein the valve acceleration sensor data represents valve acceleration in three orthogonal axes.

15. The method of claim 11, further comprising receiving and processing, by the data acquisition unit, certain sensor signals supplied by the at least one sensor for supply as part of low-frequency time-series data forwarded to the gateway device.

16. The method of claim 15, wherein the low-frequency time-series data represents at least one of: temperature of the valve, decimated data characterizing at least one operating condition of the valve, or statistical data characterizing at least one operating condition of the valve.

17. The method of claim 11, further comprising processing, by the cloud computing system, the time-series sensor data to generate at least one indicator related to operation of the valve or operation of the system.

18. The method of claim 17, wherein the at least one indicator relates to at least one of: i) availability or quality of the operation of the system, ii) information on control of the valve, or iii) information on health of the valve or remaining useful like of the valve.

19. The system of claim 1, wherein the data acquisition unit is further configured to perform quality control operations on sensor signals corresponding to actuator pressure and valve position, the quality control operations including:

detecting out-of-range data and frozen data for each of open pressure, close pressure, and position; and applying a Hampel filter to detect and replace outlier values in the open pressure, close pressure, and position sensor signals to generate corrected open pressure, corrected close pressure, and corrected position time-series data and a differential pressure channel determined as a difference between the corrected close pressure and the corrected open pressure.

20. The system of claim 19, wherein the data acquisition unit is further configured to:

process the corrected position and differential pressure data over a plurality of investigation time windows spaced by a time delay;

determine, for each investigation time window:

a standard deviation of corrected position data; and a standard deviation of differential pressure data;

compare the standard deviation of corrected position data and the standard deviation of differential pressure data to respective corresponding activity detection threshold values to identify investigation time windows that contain valve activity; and select an investigation time window having a maximum standard deviation among the investigation time windows that satisfy the activity detection threshold values as an investigation time window containing a detected valve actuation event.

* * * * *